United States Patent

Illman et al.

[11] 3,805,599
[45] Apr. 23, 1974

[54] TEXTILE DUROMETER

[75] Inventors: Walter F. Illman; Robert C. Strandberg, both of Greensboro, N.C.; Ernest R. Beckner, Batesburg, S.C.

[73] Assignee: Burlington Industries, Inc., Greensboro, N.C.

[22] Filed: Mar. 2, 1972

[21] Appl. No.: 231,177

Related U.S. Application Data

[63] Continuation-in-part of Ser. No. 854,051, Aug. 29, 1969, abandoned.

[52] U.S. Cl.............................. 73/81, 73/141 AB
[51] Int. Cl. ............................................. G01n 3/42
[58] Field of Search...73/78, 141 R, 141 A, 141 AB, 73/81; 177/210

[56] References Cited
UNITED STATES PATENTS

| | | | |
|---|---|---|---|
| 3,566,679 | 3/1971 | Toftness | 73/141 AB X |
| 2,108,575 | 2/1938 | Benedict | 177/210 X |
| 2,940,308 | 6/1960 | Calhoun | 177/210 X |
| 2,606,943 | 8/1952 | Barker | 324/115 |
| 2,313,336 | 3/1943 | Grover | 73/81 |

*Primary Examiner*—Jerry W. Myracle
*Attorney, Agent, or Firm*—Cushman, Darby & Cushman

[57] ABSTRACT

A durometer for measuring the density of yarn windings and other materials and having a spring-loaded probe member for contacting and depressing the yarn in proportion to the density thereof and an electrical bridge having a potentiometer and an indicator means in circuit wherein the potentiometer includes a wiper arm mechanically coupled to the probe member. The wiper arm is moved along the potentiometer in correspondence with the movement of the probe member to vary the resistive characteristics of the bridge whereby the current flow through the indicating means is varied in such a way that the relationship of the relative positions of the probe member with respect to the current flow through the indicator means is substantially a linear one. In an improvement, an outer ring about the probe member is displaceable after the probe member has been displaced to a given position to cause a switch to be opened and prevent further increases in hardness indication.

10 Claims, 4 Drawing Figures

3,805,599

INVENTORS
WALTER F. ILLMAN
ERNEST BECKNER
ROBERT C. STRANDBERG
BY Cushman, Darby & Cushman
ATTORNEYS

3,805,599

TEXTILE DUROMETER

This application is a continuation-in-part of Ser. No. 854,051 filed Aug. 29, 1969 (now abandoned).

The present invention relates to a durometer for measuring the hardness of textile materials, such as yarn windings.

Those concerned with the development and use of durometers for use in the measurement of the density of yarn windings and other materials such as rubber or neoprene rolls, carpets and rubber and plastic products in general have recognized the need for a durometer having a probe tip area of a configuration to give a realistic and representative measurement of the degree of softness or density of the material and wherein the measuring sensitivity is sufficient to indicate differences in density from the side to the middle and to the opposite side of a large yarn package as well as accurately measuring package density from beginning to end of a warp winding operation. The present invention fulflls this need.

Durometers in the past have been used for the testing of many types of products. The Russian patent to Ushi-utsev 135,693 describes a durometer used for measuring the consistency of fish. None of these devices has proved satisfactory for textile applications.

The general purpose of this invention is to provide a durometer which embraces all the advantages of similarly employed durometers and possesses none of the aforedescribed disadvantages. To attain this, the present invention contemplates a unique bridge arrangement in combination with a probe member whereby the density of the material can be accurately measured by the bridge circuit and an indicator such as a meter therein as determined by the position of the probe member when it indents the material.

Further, according to an improvement, further increases in the meter reading are prevented after the probe reaches a predetermined point, thus assuring the same readings regardless of user technique. In the embodiment described below an outer ring is depressed against a spring, opening a switch, whenever sufficient pressure is applied. Further, a switch having a plurality of positions is preferably used to connect different resistors to the meter and provide a plurality of scales.

An object of the present invention is the provision of a highly accurate durometer for measuring the density of yarn windings and other materials.

Other objects and features of the invention will become apparent to those of ordinary skill in the art as the discosure is made in the following description of a preferred embodiment of the invention as illustrated in the accompanying drawings in which.

The durometer of this invention provides for the accurate measurement of the hardness or uniformity of yarn windings, which accuracy is extremely important in the measurement of the uniformity of windings on dye beams preparatory to dyeing wherein the dye liquors are pumped into the perforated beams and dispersed throughout the yarn from inside to outside. Winding tension variations and variations in density of the yarn windings along the beam result in non-uniform dyeing with areas of lower tension being overdyed and areas of higher tension being underdyed.

Figure 1:
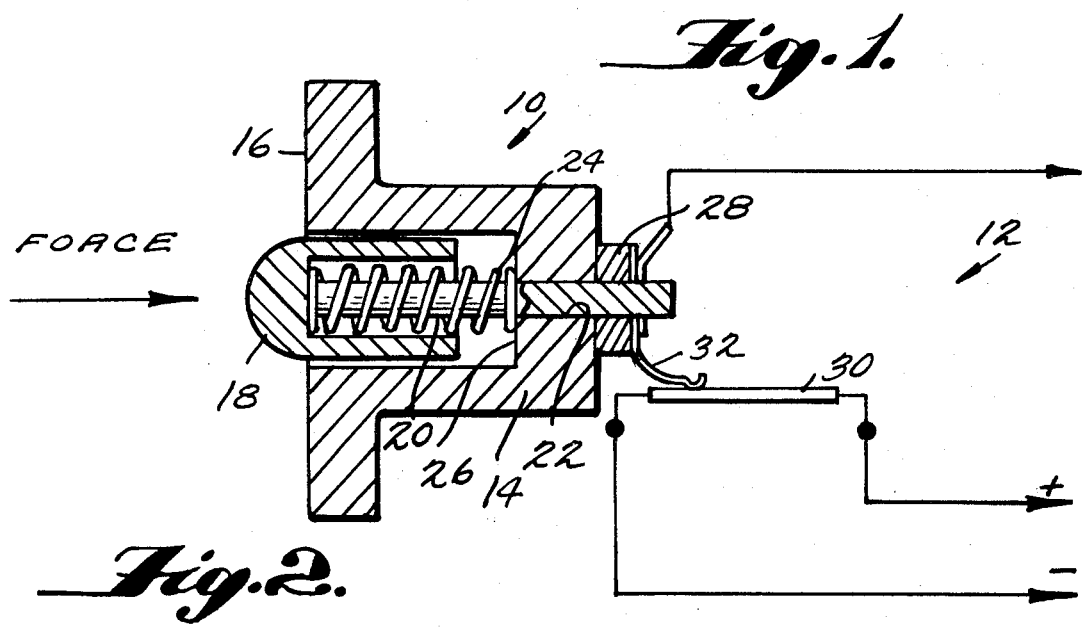
FIG. 1 shows a section of the probe means in a preferred embodiment of the invention and a simplified representation of the bridge means thereof.

With reference now to the drawings, wherein like reference characters designate like or corresponding parts, there is shown in FIG. 1 a force transducer for converting mechanical position to an electrical reading. The transducer includes a probe means 10 mechanically coupled to electrical bridge means 12, which is shown in more detail in FIG. 2. The probe means 10 includes a housing member 14 which has a bottoming face 16 for contacting the yarn or other material and for providing a reference point for movement of the movable portion of the probe means which includes a rounded probe rod 18 integral with a shaft member 20 that is slidably located through an aperture 22 located along the axis of the housing member 14. A coil spring 24 is located around the shaft member and engages an inner surface 26 of the housing member and the probe rod 18 for normally causing the probe rod to extend beyond the surface of the bottoming face. A retainer collar 28 is affixed to the shaft member 20 and at a location along the shaft member outside of the housing for limiting the normally extended position of the probe rod beyond the surface of the bottoming face to a predetermined distance.

The bridge means 12 includes a potentiometer 30 with a wiper arm 32 mechanically coupled to the shaft member 20 to enable the corresponding movement of the wiper arm with the shaft member.

Figure 2:
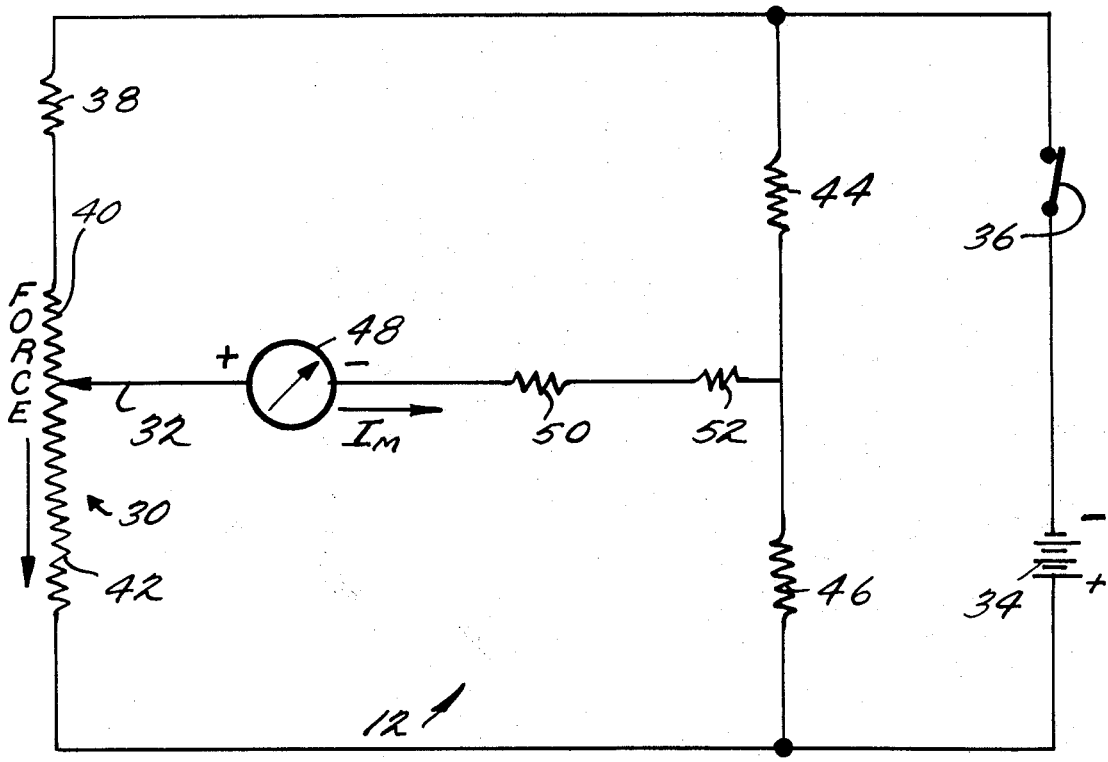
FIG. 2 is a schematic view of the bridge means in the preferred embodiment of the invention.

The bridge means is shown in more detail in FIG. 2 and further includes a source of DC electrical potential 34 in series circuit with a switch 36. A first resistor 38 is coupled between the source and the potentiometer 30 to form a portion of a first arm of the bridge and the potentiometer 30 is in circuit between the first resistor 38 and the source 34 with one side 40 of the potentiometer forming the first arm together with the first resistor 38 and the other side 42 of the potentiometer forming a second arm of the bridge 12. A second resistor 44 is coupled to the source 34 and to the first resistor 38 while a third resistor 46 is coupled between the second resistor and the source. An indicator means or ammeter 48 is coupled to the wiper arm 32 and fourth resistor means, including resistors 50 and 52, are coupled in circuit between the indicator means 48 and the junction of the second and third resistors 44 and 46, respectively.

The operating principle of the force transducer is based upon Hooke's law for an elastic body (spring) operating within its elastic region wherein Force = Compression X $k$ (spring constant) or Force = Resistance change X K (spring constant) A variety of springs with different spring constants could be used. Arbitrarily, a spring requiring a force of 17 pounds for a full probe depression of 0.6 inches, is chosen, for this example.

The bridge 12 is a modified Wheatstone resistance bridge and differs therefrom by having the wiper arm 32 move toward the high end of the potentiometer 30 with the application of force to thereby reduce the value of the resistance 42 and to simultaneously increase the resistance 40. In a standard Wheatstone bridge only the resistance 42 would change but with this modified version a greater output current, $L_M$, for a given change in resistance 42 is provided since both arms of the bridge change simultaneously.

A standard NEDA 1604 9 volt battery 34 was used in the following example of only one specific set of parameter valves applicable to the invention to provide a readily available replacement power source. For such a standard 9 volt battery the maximum load current is typically 8 milliamps. A total circuit current drain of approximately 2 ma. was selected to yield maximum battery life. With approximately equal bridge legs, the current drain per leg would then be 1 ma. . Therefore, in FIG. 2, $$R_{44} + R_{46} = 9/.001 = 9,000 \text{ ohms}$$

$R_{44} = R_{46} \approx 4,700$ ohms (nearest standard $\pm 10$ percent value)

The resistance probe $R_{40} + R_{42}$ is chosen similarly to be 5,000 ohms, and with the probe not depressed $R_{40}$ was set approximately equal to 1700 ohms.

The meter was chosen to require a current of approximately 1 percent of the bridge leg currents to provide for maximum accuracy with minimal loading of the probe resistance. The necessary meter range was then set at 0–20 $\mu$a. For a balanced bridge ($L_M = 0$), $$R_{38} = R_{42} R_{44} - R_{40} R_{46}/R_{46}$$

With $R_{40} = 1700$ ohms
$R_{42} = 5000 - 1700 = 3300$ ohms
$R_{50} = 2500$ ohms
$R_{52} = 0$ (Arbitrary for determination of R1 — less than 200,000)
$R_{44} = 4700$ ohms
$R_{46} = 4700$ ohms
$E_{34} = 9$ V
$L_M = 20 \times 10^{-6}$ amps
Therefore, $R_{38} = R_{42} R_{44} - R_{40} R_{46}/R_{46} = 1600$ ohms
For an unbalanced bridge, the equation for the meter 48 current, derived by applying Thevenins theorem, is $$I_M = \frac{E_{34}[R_{46}(R_{38}+R_{40}) - R_{42}R_{44}]}{R_{44}R_{46}(R_{38}+R_{40}+R_{42}) + R_{42}(R_{38}+R_{40})(R_{44}+R_{46}) + (R_{50}+R_{52})(R_{44}+R_{46})(R_{38}+R_{40}+R_{42})}$$

With $I_M$ selected at $20 \times 10^{-6}$ amperes for a fully depressed probe 18, the value for $R_{52}$, by rearranging the above equation, is $R_{52} =$ $$\frac{E_{34}[R_{46}(R_{38}+R_{40}) - R_{42}R_{44}] - I_M R_{44}R_{46}(R_{38}+R_{40}+R_{42}) - I_M R_{42}(R_{38}+R_{40})(R_{44}+R_{46}) - R_{50}}{I_M(R_{44}+R_{46})(R_{38}+R_{40}+R_{42})}$$

With the values as listed above, except with $R_{40}$ now equal to 4500 ohms and $R_{42}$ equal to 500 ohms,
$R_{52} = 188,097 - 2500 = 185,597$ ohms
To test for bridge linearity, the probe is depressed 50 percent of the maximum possible depression. This results in $R_{40}$ changing to 3100 ohms and $R_{42}$ to 1900 ohms. Solving the equation for meter current, $I_M$ yields $L_M = 9.83 \times 10^{-6}$ amps (Approx. 50 percent of $20 \times 10^{-6}$ amps)

Further tests show that the bridge is linear for other partial depression points. Also, it is apparent that if $R_{52}$ is adjusted to produce a meter current $L_M = 20 \times 10^{-6}$ amps for a smaller depression of the probe, the bridge remains inherently linear for partial depression points.

The present invention thus provides for a highly accurate durometer for the measurement of the density of yarn windings and other materials and wherein the durometer may be of particular use in the measuring of the hardness or uniformity of windings of yarn on cones, tube and beams. The durometer of this invention is of particular importance in the measurement of the uniformity of windings on dye beams preparatory to dyeing wherein the dye liquors are pumped into the perforated beams and dispersed throughout the yarn from the inside to the outside.

Figure 3:
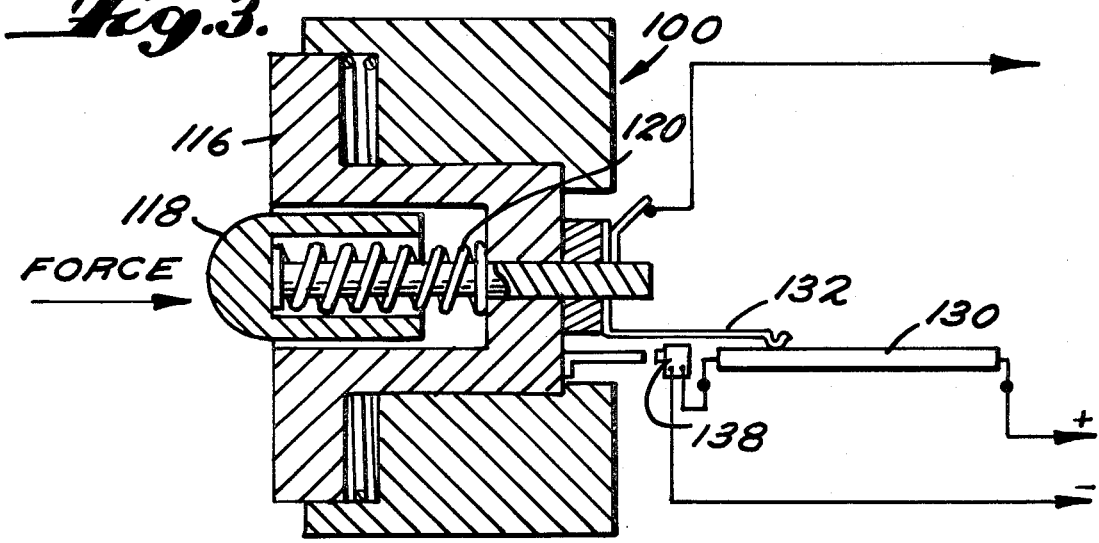
FIG. 3 shows a section of the improved probe of this invention.

Reference is now made to FIG. 3 which shows a probe 100 similar to that shown in FIG. 1 with an indenter ball or member 118 which is urged outward by spring 120. A wiper 132 moves with member 118, varying the resistance displayed by potentiometer 130. However when a sufficient pressure is applied, ring 116 about member 118 also is displaced against spring 136 to cause normally closed switch 138 to open and prevent further increases in hardness display.

Figure 4:
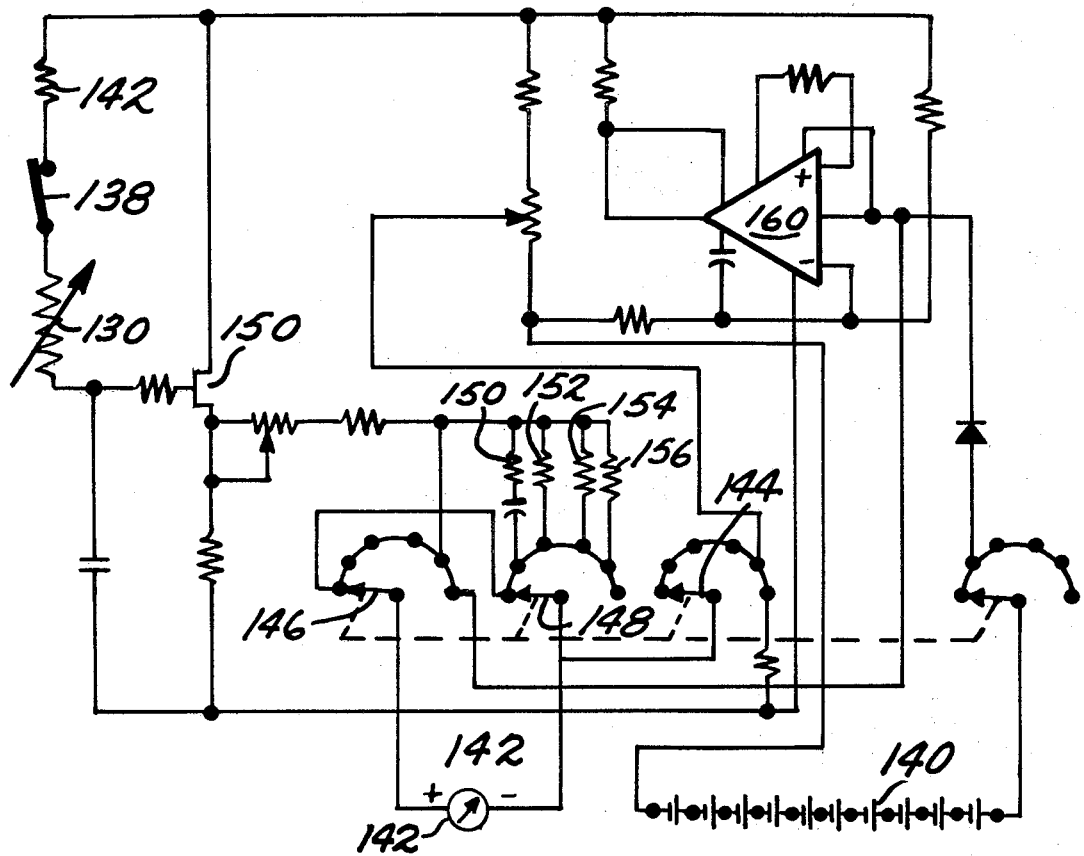
FIG. 4 shows a schematic circuit for use with the probe of FIG. 3.

Referring to the schematic of FIG. 4, the electrical power for the circuit is provided by a plurality of batteries 140, which may be dry cell batteries or the like. Batteries 140 are connected to one side of meter 142 via switch 144 which is ganged with switches 146 and 148. A field effect transistor 150 is connected to batteries 140 with the gate connected to potentiometer 130 via switch 138. A plurality of scaling resistors 150, 152, 154 and 156 are connected between transistor 150 and batteries 140 via switches 148 and 144. A different amplifier 160 is also connected in series with batteries 140.

Thus meter 142 is connected in parallel with one of the resistors 150, 152, 154, or 156 via switch 146. Further switches 146, 148 and 144 can be manually shifted together to change the resistor with which meter 142 is in parallel and accordingly vary the meter scale. The switches can also be shifted to a position for checking batteries 140.

When the probe is pressed against yarn windings or other textile material, the resistance of potentiometer 130 changes and this change varies the conductivity of transistor 150 which in turn varies the displayed hardness on meter 142. However, when a given amount of force has been applied, the outer ring is also displaced to open switch 138 and prevent further increases in the displayed hardness.

Obviously, many modifications and variations of the present invention are possible in light of the above teachings. It is therefore to be understood that within the scope of the appended claims the invention may be practiced otherwise than as specifically described.

What is claimed is:
1. A durometer for measuring the density of yarn windings and other similar materials, comprising:
probe means for contacting and depressing said yarn windings in response to an applied force and having a first portion for contacting a surface of said textile material and displaceable in response to an applied force, and a second portion engaging said first portion after said first portion has been displaced by a predetermined distance and displaceable thereafter from a first to a second position as said first portion is displaced, means urging said first and second portions toward said given and first positions respectively;

electrical bridge means having an electrical current indicating means therein for displaying a value indicating current and a potentiometer in circuit with said indicating means;

said potentiometer including a wiper arm mechanically coupled to first portion of said probe means to move with corresponding movement of at least a portion of said probe means along said potentiometer for varying the resistive characteristics of said bridge means and for varying accordingly the current flow through said indicating means, said indicating means being calibrated to accurately indicate the relative position of said probe means and the hardness or density of the surface of the yarn windings or other material and said bridge means including:

switch means connected to said detecting and producing means and to said current indicating means and engaging said second portion in said second position for shifting from a first to a second condition after said second potion has been displaced from said first position to a second position and for preventing said signal from further changing said displayed signal when said switch means is in said second position;

a source of electrical potential;

a first resistor coupled between said source and said potentiometer to form a portion of a first arm of said bridge;

said potentiometer in circuit between said first resistor and said source with one side of said potentiometer forming said first arm together with said first resistor and the other side of said potentiometer forming a second arm of said bridge;

a second resistor coupled to said source and to said fixed resistor;

a third resistor coupled between said second resistor and said source;

said indicator means coupled to said wiper arm, and fourth resistor means coupled between said indicator means and the junction of said second and third resistors;

said wiper arm movable along said potentiometer to vary the resistance of said first and second arms of said bridge.

2. A durometer as in claim 1 wherein the relationship of the relative positions of said movable portion of said probe means with respect to the current flow through said indicator means is substantially a linear one over the range of zero to maximum depression of said movable portion.

3. A durometer as in claim 1 wherein said probe means include:

a housing member having a bottoming face for contacting the yarn or other material and for providing a reference point for movement of said movable portion; and said movable portion including spring-loaded indentor probe means mechanically coupled to said wiper arm.

4. A durometer as in claim 3 wherein said housing member has an axially located aperture therein and wherein said spring-loaded indicator probe means includes:

a shaft member slidably extending through said aperature;

a rounded probe rod integral with one end of said shaft member;

spring means located around said shaft member and engaging an inner surface of said housing member and said probe rod for normally causing said probe rod to extend beyond the surface of said bottoming face; and retainer means affixed to said shaft member and at a location along said shaft outside of said housing member for limiting the normally extended position of said probe rod beyond the surface of said bottoming face to a predetermined distance.

5. A durometer as in claim 1 further including means for selectively placing said source in electrically conducting relationship with said bridge.

6. A durometer for measuring the hardness of a textile material comprising:

a probe having a first portion adapted for contacting a surface of said textile material and displaceable from a given position in response to an applied force urging said first portion against said material, and a second portion engaging said first portion after said first portion has been displaced by a predetermined distance and displaceable thereafter from a first to a second position as said first portion is displaced, means for urging said second portion toward said first position, and means for urging said first portion toward said given position, means for detecting the position of said first portion during displacement in response to said applied force and producing an electrical signal which varies as a function of the portion position, meter means for receiving said electrical signal and displaying said signal as an indication of hardness, and switch means connected to said detecting and producing means and to said meter means and engaging said second portion in said second position for shifting from a first to a second condition after said second portion has been displaced from said first position to a second position and for preventing said signal from further changing said displayed signal when said switch means is in said second position.

7. A durometer as in claim 6 further including a plurality of electrical batteries and means for connecting said batteries to said meter means and to said detecting and producing means.

8. A durometer as in claim 7 further including a manually operable switch having a plurality of positions and connected to said meter means and a plurality of resistors connected to said switch for providing a plurality of scales for said meter means.

9. A durometer as in claim 6 wherein said detecting means includes a potentiometer having a resistance which varies as a function of the position of said portion.

10. A durometer for measuring the hardness of a textile material comprising:

a probe having a portion adapted for contacting a surface of said textile material and displaceable from a first position in response to an applied force urging said portion against said material, means for urging said portion toward said first position, an outer ring about said contacting portion, and means urging said ring outward so that said ring moves to cause said switch means to shift to said second position only after said probe portion has moved a given distance, means for detecting the position of said portion during displacement in response to said applied force and producing an electrical signal which varies as a function of the portion position, meter means for receiving said electrical signal and displaying said signal as an indication of hardness, and switch means connected to said detecting and producing means and to said meter means for shifting from a first to a second condition after said portion has been displaced from said first position to a second position and for preventing said signal from further changing said displayed signal when said switch means is in said second position.

* * * * *